(12) United States Patent
Novoa et al.

(10) Patent No.: US 12,554,254 B2
(45) Date of Patent: Feb. 17, 2026

(54) TRIP PREDICTOR ALGORITHM

(71) Applicant: General Electric Company, Schenectady, NY (US)

(72) Inventors: Erick Patiño Novoa, Querétaro (MX); Mario Alfonso Trejo, Querétaro (MX); Uriel Eduardo Soria, Querétaro (MX)

(73) Assignee: GE VERNOVA INFRASTRUCTURE TECHNOLOGY LLC, Greenville, SC (US)

( * ) Notice: Subject to any disclaimer, the term of this patent is extended or adjusted under 35 U.S.C. 154(b) by 504 days.

(21) Appl. No.: 17/819,997

(22) Filed: Aug. 16, 2022

(65) Prior Publication Data

US 2024/0061412 A1 Feb. 22, 2024

(51) Int. Cl.
*G05B 23/02* (2006.01)
*H02J 13/00* (2006.01)

(52) U.S. Cl.
CPC .... *G05B 23/0235* (2013.01); *H02J 13/00002* (2020.01)

(58) Field of Classification Search
CPC .............. G05B 23/0235; H02J 13/00002
See application file for complete search history.

(56) References Cited

U.S. PATENT DOCUMENTS

| | | | |
|---|---|---|---|
| 6,727,821 B2 * | 4/2004 | Weekes | H02H 6/005 340/646 |
| 11,218,023 B2 | 1/2022 | Manson et al. | |
| 2011/0062708 A1 * | 3/2011 | Prochaska | F02D 29/06 700/287 |
| 2012/0061961 A1 * | 3/2012 | Yasugi | F03D 9/255 290/44 |
| 2012/0205912 A1 * | 8/2012 | Wakasa | F03D 7/0284 290/44 |
| 2013/0241203 A1 * | 9/2013 | Kleen | F01D 15/10 290/52 |
| 2016/0281607 A1 * | 9/2016 | Asati | F02C 7/26 |
| 2018/0331533 A1 * | 11/2018 | Lifeng | H02H 3/46 |
| 2019/0279314 A1 * | 9/2019 | Alakontiola | H02J 3/388 |
| 2021/0054741 A1 | 2/2021 | Lopez et al. | |
| 2021/0262689 A1 | 8/2021 | Shinde et al. | |
| 2021/0332806 A1 | 10/2021 | Huberman et al. | |

FOREIGN PATENT DOCUMENTS

| | | |
|---|---|---|
| CN | 114 430 174 A | 5/2022 |
| CN | 114 844 964 A | 8/2022 |
| JP | 109 038 614 A | 12/2018 |
| JP | 2019106752 A * | 6/2019 |

* cited by examiner

*Primary Examiner* — Howard Cortes
(74) *Attorney, Agent, or Firm* — Eversheds Sutherland (US) LLP

(57) ABSTRACT

Systems and methods are disclosed for automated power plant unit trip prediction and control. Power plant controls may have limited time to manage the plant loads when one of the units trips unexpectedly. To mitigate any consequences on a power grid associated with a trip event, these systems and methods may allow for prediction of such trip events. The predictions may allow a signal to be provided to a controller in sufficient time for the controller to automatically take any necessary action to mitigate any impacts of the future trip event.

20 Claims, 9 Drawing Sheets

TRIP PREDICTOR ALGORITHM

FIELD OF DISCLOSURE

The present disclosure is related to power systems, and more particularly to systems and methods for automated power plant unit trip prediction and control.

BACKGROUND

Power plant controls may have limited time to manage the plant loads when one of the units trips unexpectedly. The end user of the energy produced by the plant perceives the quality of the energy with frequency fluctuation. In some cases, units may not be able to efficiently control the frequency fluctuation when one or more units trip. This may be because the tripping event may instantly cause a loss of Megawatts and there may not be sufficient time for the plant control to manage the loads to mitigate such frequency fluctuations.

BRIEF DESCRIPTION OF THE DRAWINGS

The detailed description is set forth with reference to the accompanying drawings. The drawings are provided for purposes of illustration only and merely depict exemplary embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

This disclosure relates to, among other things, systems and methods for automated power plant unit trip prediction and control. A power plant may be a facility that houses one or more generators (and/or any other type of power-generation unit) that may be used to generate power for one or more loads located on a power grid that is serviced by the power plant. Generators within the power plant may be configured such that the units may automatically trip (for example, a circuit providing power to the unit may open, which may result in a shutdown of the unit) to protect the equipment when operational parameters go out of specification. However, these trips may not necessarily be predictable and may unexpectedly cause frequency fluctuations on the power grid, which may impact the quality of the power that is provided to any loads that are being supplied power by the power plant (for example, customer homes, etc.). Power plants may have limited time to manage plant loads when a unit trips unexpectedly. Given this, the systems and methods described herein allow for a future unit trip event to be predicted, which may allow for control systems associated with the power plant to take specific actions to mitigate any frequency fluctuations that may occur based on the unit tripping.

At a high level, these unit trip predictions may be facilitated by improvements to power plant controller logic. This improved logic may involve the use of a trip set point (a corresponding data value at which a trip is likely to occur or will occur) and an established threshold value associated with a data point before the trip set point. A combination of an indication that the data has crossed this threshold value along with an indication that a rate of change of the data with respect to time (which may be automatically calculated based on real-time sensor data obtained from the unit) is greater than a threshold rate of change value may be used to predict a future trip of the unit and/or an estimated amount of time before the trip occurs. More specific details about the automated logic that is involved in making such determinations may be provided with respect to at least FIGS. 1, 2A-2B, and 3A-3B (as well as any other figure and associated description). Knowing some milliseconds (or any other amount of time) in advance that the unit is going to trip may provide a controller sufficient time to automatically take a corresponding action, such as shedding a load, starting another unit, or setting a proper Megawatt set point on the other units to reduce frequency fluctuation on the grid. While reference may be made herein to units in a power plant, these same systems and methods may be applicable in any other context as well.

Figure 1:
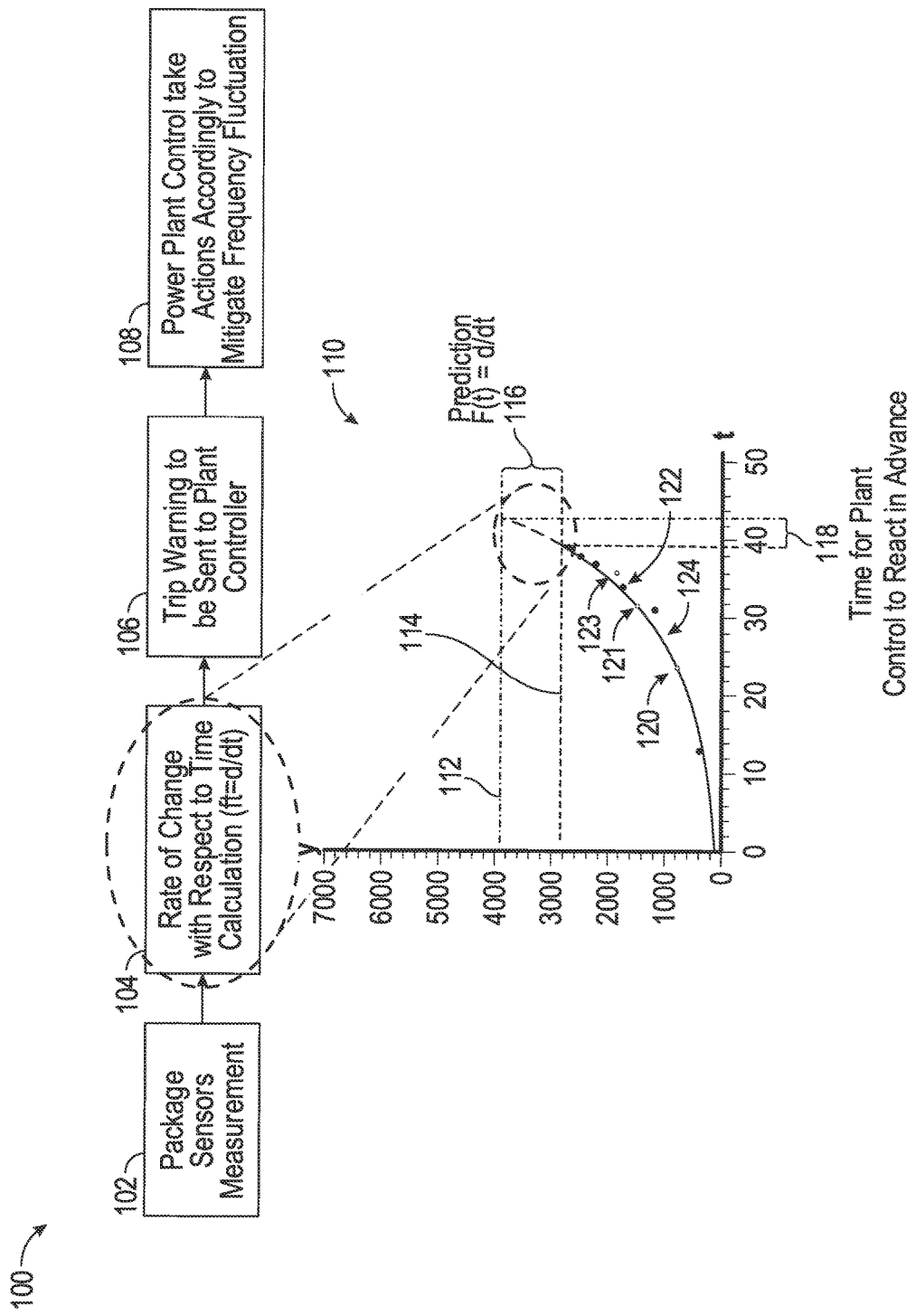
FIG. 1 depicts an example flow diagram, in accordance with one or more example embodiments of the disclosure.

Turning to the figures, FIG. 1 depicts an example flow diagram 100, in accordance with one or more example embodiments of the disclosure. The flow diagram 100 presents high-level operations that may be performed in association with the method for prediction of unit trips. The operations described with respect to FIG. 1 may be performed by controller(s) 512, controller(s) 532, system 700, as described with respect to FIGS. 5 and 7, any other computing device or system that may be located at the power plant and/or remote from the power plant, and/or a combination of such devices and/or systems, for example.

The flow diagram 100 begins with operation 102, which may involve obtaining sensor measurements. These sensor measurements may relate to any types of data that are captured from any number of different types of units in the power plant that are being monitored using the methods described herein. These sensor measurements may include the process variable (Pvar) values described with respect to FIGS. 2A-2B and 3A-3B. One example of a sensor measurement that may be obtained includes a shaft speed of a generator. Multiple additional types of sensor measurements may also be obtained for the generator in addition to the shaft speed as well. That is, there may be multiple different types of data associated with the operation of the generator that may indicate a trip is likely to occur (rather than just one type of data). Further, the types of data that are obtained may vary depending on the particular type of unit that is being monitored. In other words, the method may not necessarily perform unit trip predictions based on one or more fixed types of data, but may vary depending on the particular units that are being monitored for trips.

From operation 102, the flow diagram 100 proceeds to operation 104. Operation 104 may involve determining a rate of change with respect to time for any of the sensor measurements that are obtained in operation 102. In one or more embodiments, the rate of change for any given type of sensor data may be determined by determining a slope of a sample of data points captured in real-time. For example, a current rate of change value may be determined by calculating a slope of every sample of four real-time data points as the sensor measurements are obtained (however, any other number of data points may be included in the sample as well). An example of this rate of change determination is illustrated in plot 110, which is also included in the figure. The data point 120, data point 121, data point 122, and data point 123 may represent a real-time sample of four data points captured by a sensor. For example, these data points may represent shaft speeds of the generator at different times. Based on the four data points, a slope 124 associated with a plot 110 including the four data points may be determined. This slope 124 may represent the rate of change of the particular type of data during the time at which the four data points were obtained. This rate of change may vary over time depending on the values of any subsequent data points that are obtained through future sensor measurements. This rate of change value may also be determined in any other manner using the real-time data points as well. Additionally, FIGS. 2A-2B and 3A-3B may provide additional details relating to the logic associated with at least operation 104.

From operation 104, the flow diagram 100 proceeds to operation 106. Operation 106 may involve sending a trip warning to one or more controllers (for example, controller(s) 512, controller(s) 532, system 700, any other computing device or system, and/or a combination of such devices and/or systems) of the power plant (the controller(s) may be located at the power plant and/or remotely from the power plant as well). This trip warning may be a signal that is sent to indicate that the unit is likely to experience a trip in the future based on a current data value compared to a threshold value and a current rate of change of the data values compared to a threshold rate of change value. The trip warning may also indicate an estimated amount of time until the trip is likely to occur (for example, the time difference 118). The plot 110 illustrates why both of these conditions may be used to trigger the trip warning being sent to the one or more controllers.

As shown in the plot 110, the method may involve the use of a threshold value 114 and a trip set point 112. The trip set point 112 may represent the data value at which the particular unit may automatically be tripped. For example, if a generator has a shaft speed trip set point of 4320 RPM, then the generator may be tripped once the shaft speed reaches that value of 4320 RPM (or surpasses the value). The trip set point 112 may not necessarily be limited to a value that the captured data must surpass, but may also include a value that captured data may fall below as well (for example, as illustrated through FIGS. 3A-3B). It is desirable for any controller handling automated operations of the power plant to have knowledge that the unit trip is likely to occur before this trip set point 112 is reached and the unit is actually tripped. This is because the controller may need to adjust the operation of other units in the power plant to prepare for the trip of the particular unit (and/or take any other type of action, such as reducing one or more loads handled by the power plant).

Given this, the threshold value 114 may be established as a value that is lower than the trip set point 112 (or higher than the trip set point depending on if going above or below the trip set point causes the trip event) to be used as a trigger point to predict when the unit is likely to trip to allow the controller sufficient time to take appropriate action. For example, the threshold value could be set as 3,000 RPM (as a non-limiting example). In addition to this threshold value 114, a rate of change of the data values may also be determined and compared to a threshold rate of change (more specific details about how any of these values are calculated may also be provided in the flow diagrams presented in FIGS. 2A-2B and 3A-3B). Based on this comparison, an amount of time before the data reaches the trip set point 112 may be determined (which may be shown in the plot 110 as time difference 118). Based on all of this, a signal may be sent to the one or more controllers prior to the unit tripping to allow a controller sufficient time to take appropriate action before the trip occurs.

Additionally, the threshold value 114, trip set point 112, and threshold rate of change may not necessarily be fixed, but rather may vary depending on the specific unit that is involved. In this manner, a threshold value 114 may be set to provide a sufficient time difference 118 for the controller to take appropriate action. For example, the difference between the trip set point 112 and the threshold value 114 for a generator (and or the threshold rate of change) may be different for a generator than it may be for a different type of unit in the power plant. The threshold value 114, trip set point 112, and threshold rate of change may also vary among specific units of the same type as well. For example, an older unit may be provided a different set of thresholds than a newer unit because the operation of the older unit may not exactly align with the operation of the newer unit. Further, threshold value 114, trip set point 112, and threshold rate of change may differ depending on the specific type of data that is being monitored. For example, shaft speed data, temperature data, and/or any other types of relevant data may all be monitored for a single generator. These different types of data may be associated with their own individual threshold value 114, trip set point 112, and threshold rate of change. Additionally, reference to a trip point being greater than a threshold value, a data point going above a threshold value or a trip point, or any other similar description, may be exemplary and the same may apply to thresholds that are met when values fall below the thresholds as well. These are merely examples of how these values may vary among units, and the values may also vary depending on any other number of factors as well.

The threshold value 114, trip set point 112, and threshold rate of change (as well as any other types of thresholds used) may be determined through any number of different methods. As a first example, a manual testing process may be used to determine the trip set points for each type of data that may be collected from any of the different units. Likewise, the appropriate threshold values and threshold rate of changes may be manually determined to establish threshold values that may be used with the logic described herein to allow a power plant controller sufficient time to take any automated actions to mitigate frequency fluctuations. As a second example, the threshold values may also automatically be determined using artificial intelligence, machine learning, or the like. Additionally, any models associated with the artificial intelligence, machine learning, or the like may be trained in real-time based on events such as data capture, unit trips, etc. This may allow the thresholds to be adjusted in real-time based on real-time data points associated with the units.

From operation 106, the flow diagram 100 proceeds to operation 108. Operation 108 may involve the one or more controllers automatically performing any number of actions to mitigate frequency fluctuations produced by the power plant, which may impact loads that are being provided power by the power plant. A first example of such an automated action may include shedding or releasing a load. This may involve ceasing the supply of power to certain loads that may otherwise be provided power by the power plant. A second example may include starting another unit to make up for the capacity of the generation that is likely to trip. A third example may include modifying a set point on the other units to reduce frequency fluctuation on the grid. These are just a few non-limiting examples of automated actions that may be taken by a controller, and any other types of automated actions may be taken as well.

Figure 2A:
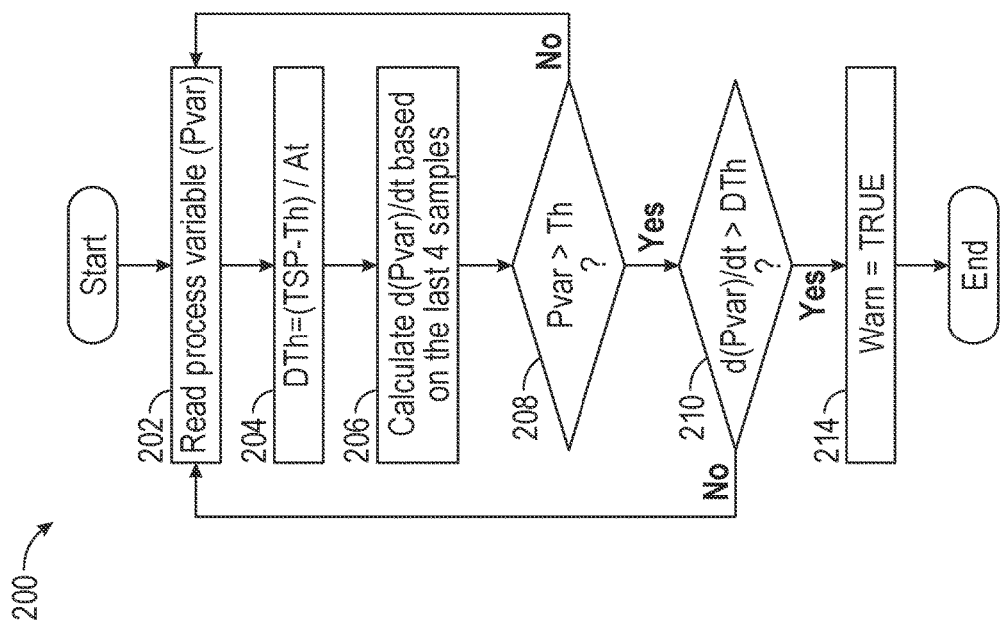
FIGS. 2A-2B depict example flow diagrams, in accordance with one or more example embodiments of the disclosure.
Figure 2B:
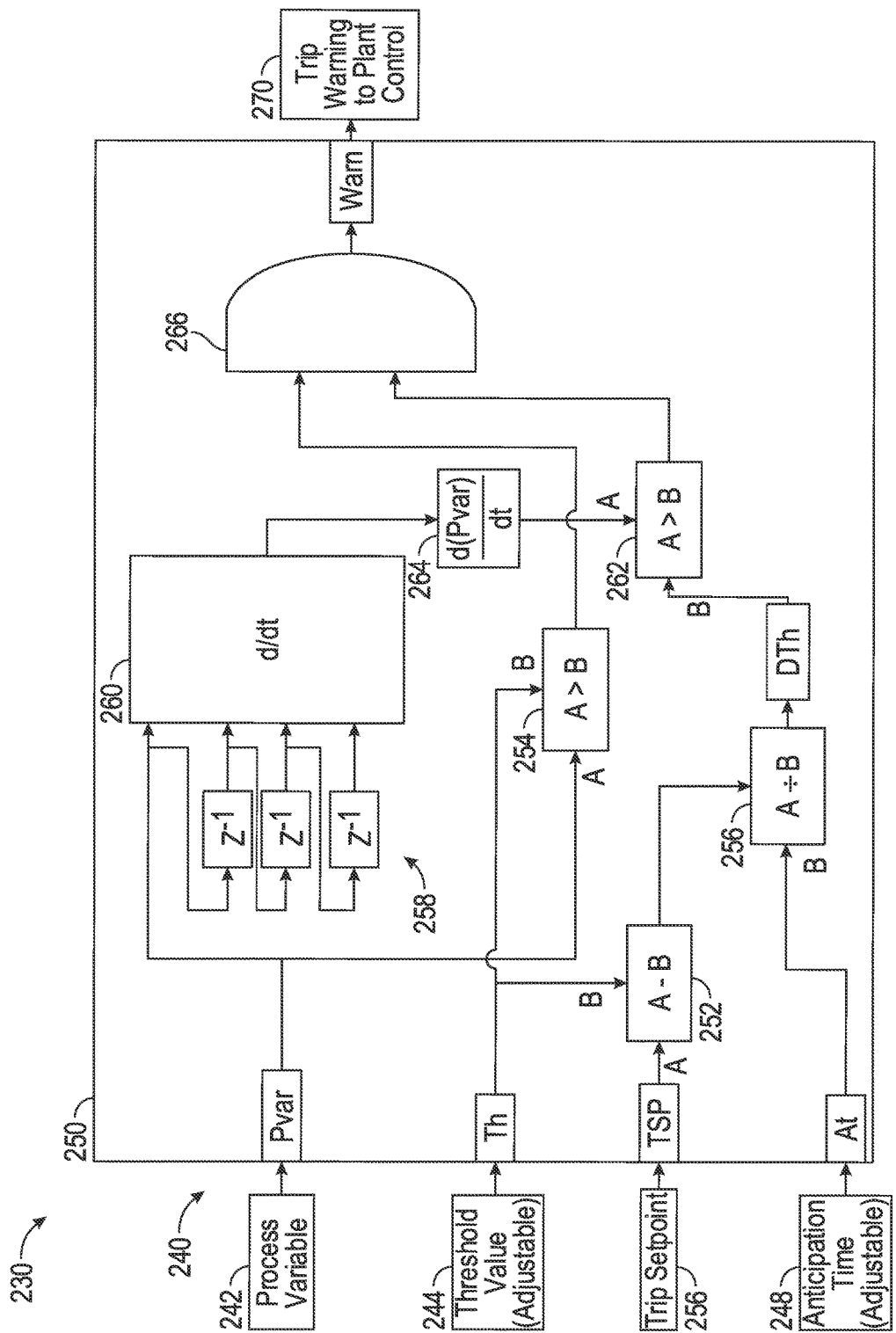

FIGS. 2A-2B depict example flow diagrams, in accordance with one or more example embodiments of the disclosure. With respect to FIG. 2A (and FIG. 3A described below), the following variable definitions may be applicable. Pvar, Th, TSP, and At may be inputs. Pvar may be a process variable, Th may be a threshold value, TSP may be a trip set point, and At may be an anticipated time value. Warn may be an output variable that may represent a trip warning that is provided to a controller associated with a plant. DTh may be an internal variable that may indicate a rate of change threshold.

Beginning with FIG. 2A, flow diagram 200 shows logic for a trip prediction algorithm associated with a use case involving a high trip limit and a positive slope. A high trip limit and positive slope may refer to a scenario where data points need to rise above a set point for a trip event to occur. For example, if a shaft speed set point is 3,500 RPM, then the shaft speed may need to rise above this value for the trip to occur (rather than the shaft speed falling below the value to trigger the trip event). For consistency's sake, the example of a generator shaft speed process variable (Pvar) may be used, however, this is merely exemplary and is not intended to be limiting in any way (that is, any other process variable and/or combination of multiple process variables may also be applicable).

The flow diagram 200 begins with operation 202, which may involve receiving the process variable (this may be the same as, or similar to, operation 102 in FIG. 1). The particular process variable that is used as an input may depend on the type of unit that is being monitored. For example, if the unit that is being monitored at the power plant is a generator, then a shaft speed of the generator may be monitored. Thus, the process variable may be a shaft speed in rotations per minute (RPM). However, this is just one non-limiting example of a type of process variable and any other type of variable may also be monitored as well. As additional non-limiting examples, pressure data or temperature data may also be monitored (as well as any other types of data that may be captured from a generator or any other type of unit that is being monitored). In some instances, more than one process variable may be monitored in parallel and any number of different types of process variables may be monitored across any of the units that may exist in the power plant.

Following operation 202, the flow diagram 200 proceeds to operation 204, which may involve calculating a value for the rate of change threshold (DTh). This rate of change threshold may be calculated by taking a difference between the trip set point (TSP) and the threshold value (Th) and dividing the resulting value by the anticipated time (At) value. In some cases, At may be a value that is manually tuned (however, the value may be automatically determined as well). In some example cases, the window may include a range from 500 ms to 3 s (however, any other value may be used as well. As aforementioned, the trip set point and threshold value may be pre-established values for a given unit and type of data and may be fixed or dynamic (may adjust over time). That is, within a given power plant, there may be numerous trip set points, thresholds, and types of data that are being monitored for different units and different types of units. For example, a first generator may have a first set of set points and thresholds and a second generator may have a second set of set points and thresholds. Additionally, other types of units beyond generators may also have their own associated set points and thresholds. This calculation is shown below as Equation 1.

$$DTh = \frac{TSP - Th}{At} \quad \text{(Equation 1)}$$

Following operation 204, the flow diagram 200 proceeds to operation 206. Operation 206 may involve calculating a rate of change of the process variable. For example, a rate of change of the shaft speed of the generator. The rate of change of the process variable may be determined by calculating a change in the value of the process variable over time using a sample of real-time data points. Particularly, the rate of change may be determined by calculating a slope of a plot formed using the sample of real-time data points. In some instances, a sample of the four last real-time data points may be used to perform this determination. However, any other number of data points may be used in the sample as well. Additionally, the rate of change may be determined using any other method based on real-time or historical data points.

Following operation 206, the flow diagram 200 proceeds to condition 208. Condition 208 may involve a determination as to whether the process variable value is greater than the threshold value. The threshold value may represent a value of the process variable that may be associated with a condition in which a trip of the power plant unit may be likely to occur in the future (for example, if the process variable value continues to increase). As shown in FIG. 1, the threshold value may be a value that is established below the trip set point for the unit such that sufficient time is provided for an indication that the trip may occur to be provided to a controller to take appropriate action to mitigate any impact of the unit tripping. For example, the threshold value for the shaft speed of the generator may be 3,000 RPM. If the current shaft speed of the generator was determined to be 3,050 RPM (for example, based on sensor measurements associated with the generator), then this may provide an indication that the generator may be likely to trip in the future. If it is determined in condition 208 that the process variable value is greater than the threshold, then the flow diagram 200 proceeds to condition 210. If, however, it is determined that the process variable value is less than the threshold value, then the flow diagram 200 proceeds to operation 212.

Condition 210 may involve a determination as to whether a rate of change of the process variable value is greater than the threshold rate of change value. If it is determined that the rate of change of the process variable value is greater than the threshold rate of change value, then the flow diagram 200 proceeds to operation 214. If, however, it is determined that the rate of change of the process variable is less than the threshold rate of change value, then the flow diagram 200 returns to operation 202. The rate of change threshold may vary depending on the specific unit and/or type of unit. For example, if it is desired to provide a trip warning signal a second before the trip is likely to occur for one unit, then this may be reflected by one rate of change threshold. If, however, it is desired to provide a trip warning signal in less than a second before a trip is likely to occur for another unit, then the rate of change threshold may be different for that particular unit.

Operation 214 may involve sending a signal indicating that a trip has occurred in the unit being monitored. The signal may be sent to one or more controllers that may be used to automatically control any operations within the power plant (for example, controller(s) 512, controller(s) 532, system 700, any other computing device or system, and/or combination of such devices and/or systems). In one or more embodiments, the one or more controllers may be located at the power plant and/or may be located at a remote location as well. There may be one or more centralized controllers that control operations for all units within the power plant, individual units or groups of units may include their own associated controllers.

Once a controller has received the indication that a particular unit has tripped, the controller may take any number of different actions. As a first example type of action, the controller may send a shutdown signal to the unit. The controller may also send signals to other units in the power plant to account for the load that was previously handled by the unit that received the shutdown signal. In some instances, if the capacity of the remaining units is not sufficient to accommodate for the shutdown of the unit, then nonessential loads may be released so frequency may be held at nominal speed or close to nominal speed. Any number of other types of automated actions may also be performed by the controller as well, such as providing an alert to a user, for example.

FIG. 2B shows another flow diagram 230 that may include similar operations as the flow diagram 200, but may present the operations as a series of logical operations and logic gates. The flow diagram 230 may include one or more inputs 240, a processing stage 250, and one or more outputs 270.

The one or more inputs 240 may include the same inputs as the flow diagram 200. For example, the one or more inputs 240 may include a process variable 242 (Pvar), a threshold value 244 (Th), a trip set point 246 (TSP), and an anticipation time 248 (At).

The processing stage 250 may receive the one or more inputs 240 and may perform at least the following operations. At logic block 252, a difference between the threshold value and the trip set point may be determined. The resulting value may be provided to logic block 256, which may involve determining a ratio of this resulting value and the anticipation time 248. The result of logic block 256 may be the rate of change of the threshold value. In addition to this logic for determining the rate of change of the threshold value, logic block 254 may involve determining if the value of the process variable 242 is greater than the threshold value 244. Further, logic block 260 may involve determining a rate of change of the process variable (as indicated by the derivative with respect to time). In digital control, $z^{-1}$ may refer to a previous value from a previous scan in logic execution. For example, the $z^{-1}$ blocks are in a cascade so the derivate block (logic block 260) is fed with the current value and the last three previous values ($z^{-1}$, $z^{-2}$, $z^{-3}$). This may be a control method used to represent a past value of a variable, with the negative power of Z indicating how many intervals in the past the value was captured. While three $z^{-1}$ blocks are shown, any other number of blocks may also be used. Any of these logic blocks may be executed in parallel or in serial (this may also apply to any other logic shown in the figure).

Once the rate of change of the process variable and the rate of change of the threshold value are determined, logic block 262 may involve determining if the rate of change of the process variable is greater than the threshold rate of change. The results of logic block 254 and logic block 262 may be provided to the logical AND gate 266. That is, if both of these conditions are true, then the flow diagram 230 proceeds to produce the one or more outputs 270.

Figure 3A:
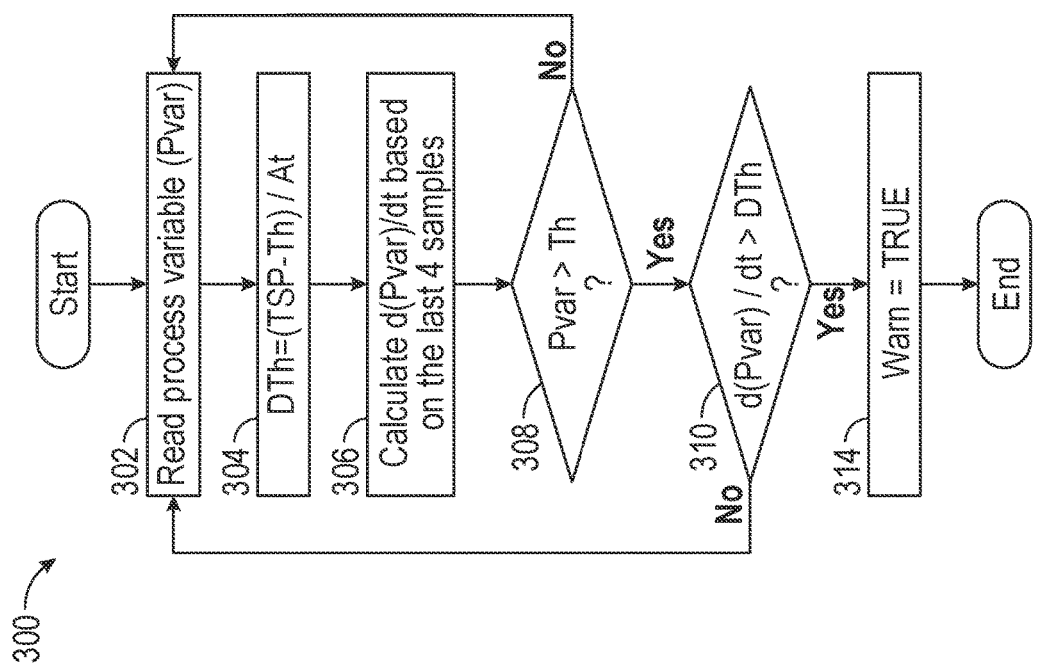
FIGS. 3A-3B depict example flow diagrams, in accordance with one or more example embodiments of the disclosure.
Figure 3B:
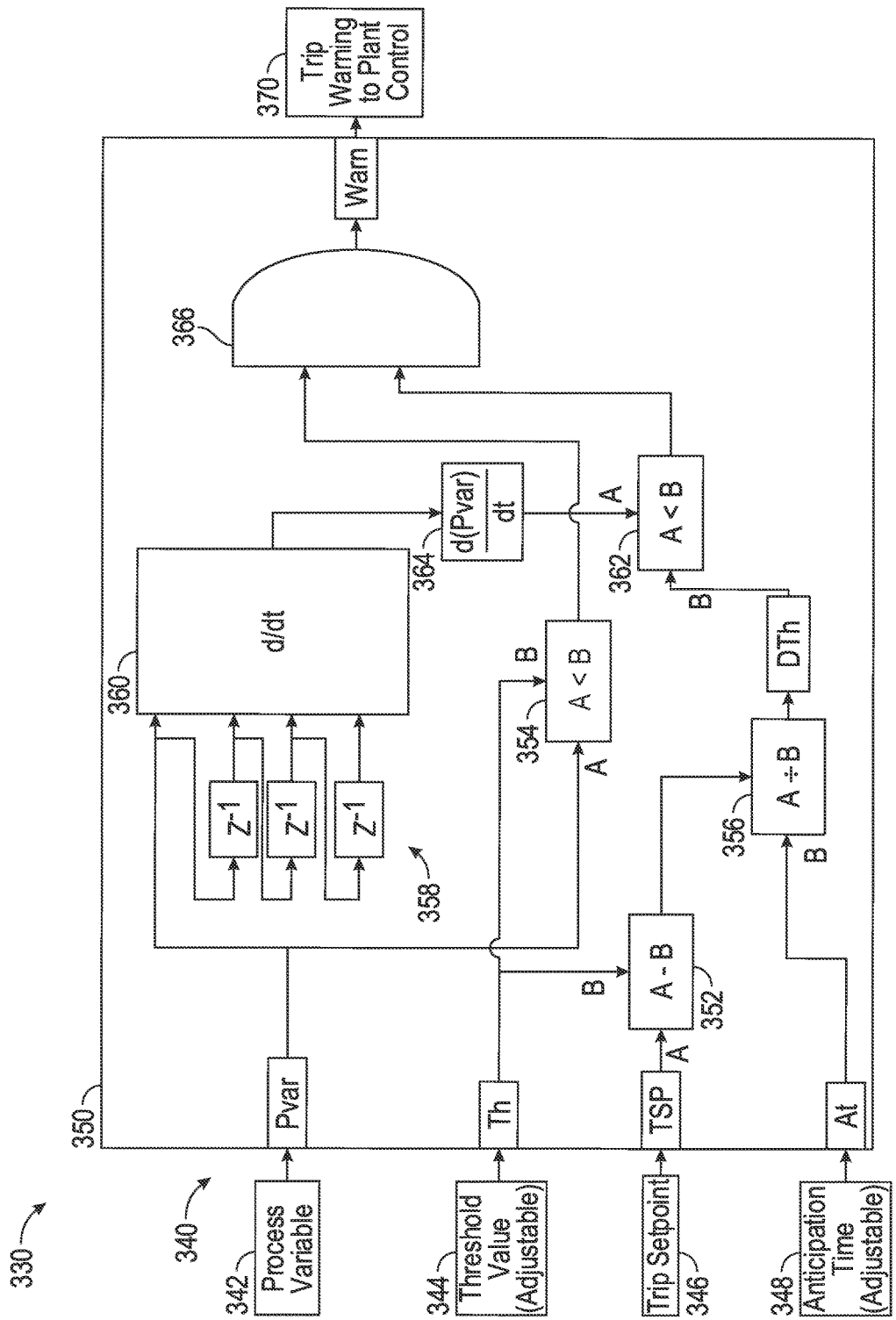

FIGS. 3A-3B depict example flow diagrams, in accordance with one or more example embodiments of the disclosure. That is, FIG. 3A illustrates a similar flow diagram 300 as FIG. 2A, but includes logic associated with variables that provide indications that a trip may occur when the variable crosses below a threshold, rather than above a threshold as illustrated in FIG. 3A.

Beginning with FIG. 3A, flow diagram 300 shows logic for a trip prediction algorithm associated with a use case for a low trip limit and a negative slope. The flow diagram 300 begins with operation 302, which may involve reading the process variable (this may be the same as, or similar to, operation 102 in FIG. 1 and operation 202 of FIG. 2A).

Following operation 302, the flow diagram 300 proceeds to operation 304, which may involve calculating a value for the rate of change threshold (DTh). This rate of change threshold may be calculated in a similar manner described with respect to operation 204 of FIG. 2A (for example, using Equation 1).

Following operation 304, the flow diagram 300 proceeds to operation 306. Operation 306 may involve calculating a rate of change of the process variable. For example, a rate of change of the shaft speed of the generator. The rate of change of the process variable may be determined in a similar manner as described with respect to operation 206 of FIG. 2A.

Following operation 306, the flow diagram 300 proceeds to condition 308. Condition 308 may differ from condition 208 of FIG. 2A. That is, condition 308 may involve a determination as to whether the process variable value is less than the threshold value instead of greater than the threshold value. Condition 310 may also differ from condition 310 of FIG. 2A. That is, condition 310 may involve a determination as to whether a rate of change of the process variable value is less than the threshold rate of change value. If it is determined that the rate of change of the process variable value is greater than the threshold rate of change value, then the flow diagram 300 proceeds to operation 312. If, however, it is determined that the rate of change of the process variable is less than the threshold rate of change value, then the flow diagram 300 returns to operation 302.

Operation 314 may involve sending a signal indicating that a trip has occurred in the unit being monitored. The signal may be sent to one or more controllers that may be used to automatically control any operations within the power plant (for example, controller(s) 512, controller(s)

532, system 700, any other computing device or system, and/or combination of such devices and/or systems).

FIG. 3B shows another flow diagram 330 that may include similar operations as the flow diagram 300, but may present the operations as a series of logical operations and logic gates (similar to FIG. 2B).

The flow diagram 330 may include one or more inputs 340 (which may be the same as, or similar to, the inputs 240 of FIG. 2B), a processing stage 350 (which may be similar to the processing stage 250 of FIG. 2B), and one or more outputs 370 (which may be the same as, or similar to, the one or more outputs 270 of FIG. 2B).

The processing stage 350 may receive the one or more inputs 340 and may perform at least the following operations. At logic block 352, a difference between the threshold value and the trip set point may be determined. The resulting value may be provided to logic block 356, which may involve determining a ratio of this resulting value and the anticipation time 348. The result of logic block 356 may be the rate of change of the threshold value. In addition to this logic for determining the rate of change of the threshold value, logic block 354 may involve determining if the value of the process variable 342 is less than the threshold value 344. Further, logic block 360 may involve determining a rate of change of the process variable (as indicated by the derivative with respect to time). Any of these logic blocks may be executed in parallel or in serial (this may also apply to any other logic shown in the figure).

Once the rate of change of the process variable and the rate of change of the threshold value are determined, logic block 362 may involve determining if the rate of change of the process variable is less than the threshold rate of change. The results of logic block 354 and logic block 362 may be provided to the logical AND gate 366. That is, if both of these conditions are true, then the flow diagram 330 proceeds to produce the one or more outputs 370.

Figure 4:
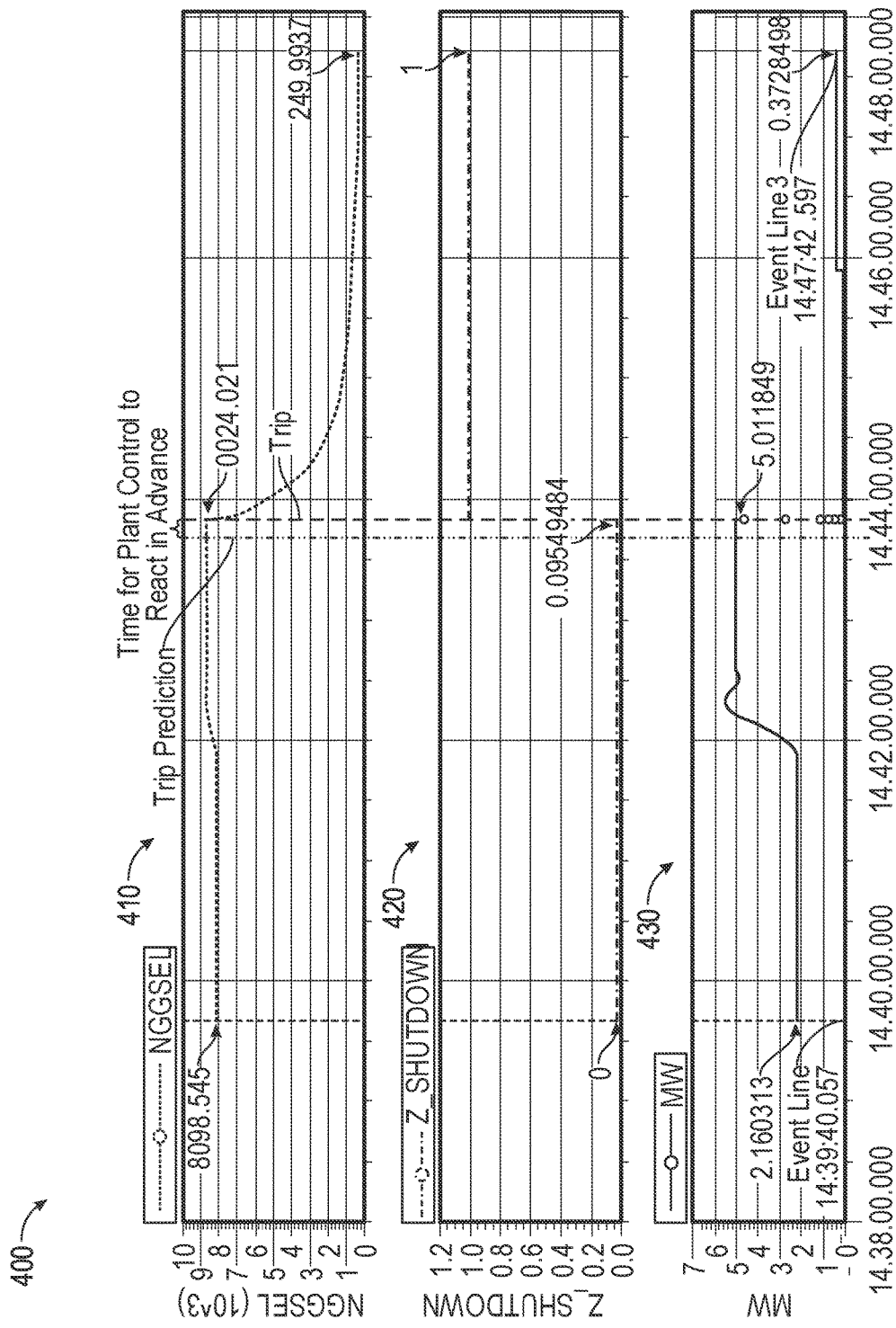
FIG. 4 depicts example plots, in accordance with one or more example embodiments of the disclosure.

FIG. 4 depicts example plots, in accordance with one or more example embodiments of the disclosure. Plot 410 provides an illustration of a shaft speed of a generator decreasing at the moment a trip event occurs with respect to the generator. This may show how the warning signal may be transmitted before the trip signal for the generator is provided (as shown in plot 420). Plot 430 illustrates a lost is the output of the power plant (for example, shown in units of megawatts) when the trip event occurs.

Figure 5:
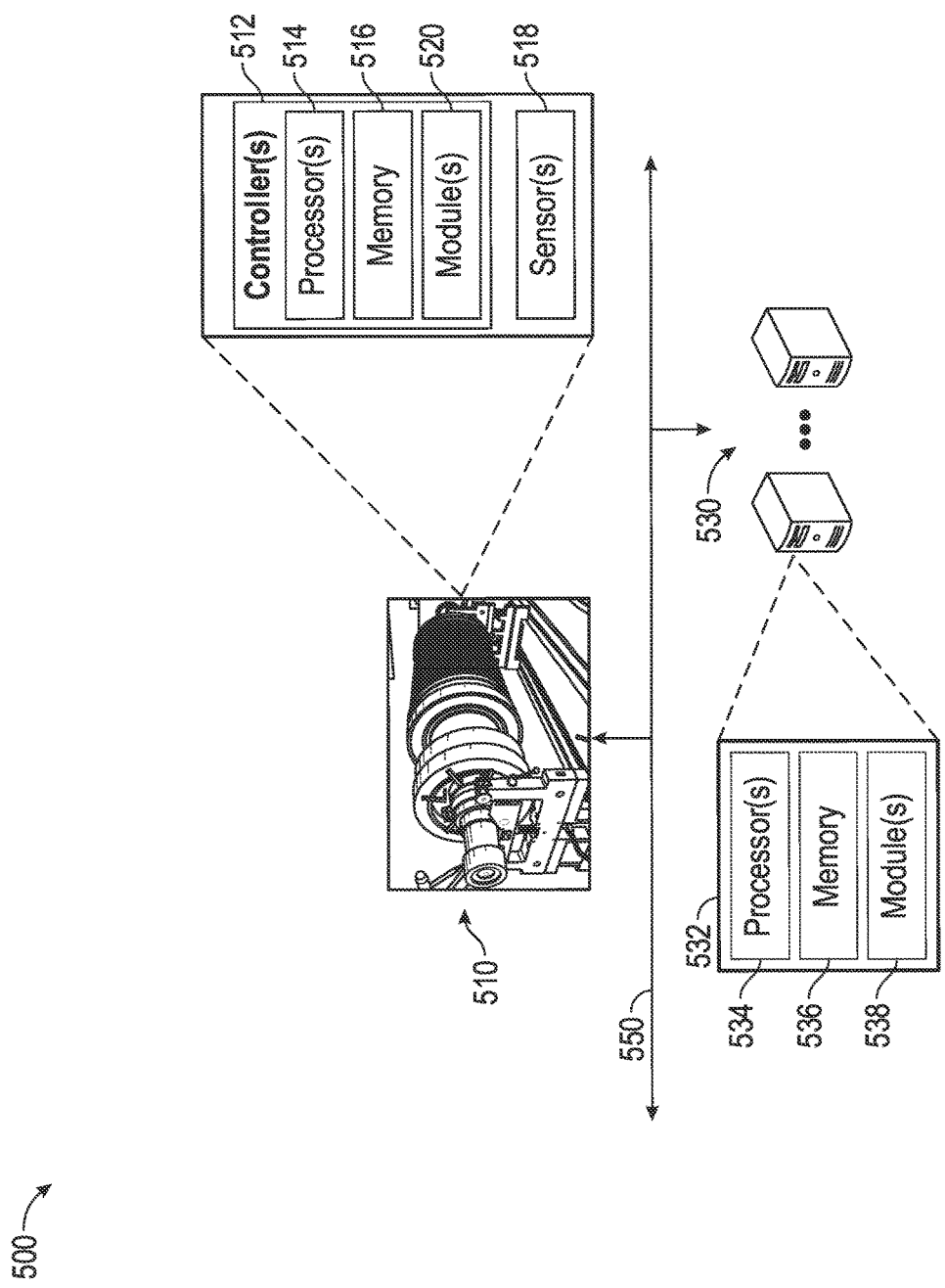
FIG. 5 depicts an example system, in accordance with one or more example embodiments of the disclosure.

FIG. 5 is a schematic block diagram of an illustrative system 500 in accordance with one or more example embodiments of the disclosure. In one or more embodiments, the system may include at least one or more units 510, which may be located within a power plant (not shown in the figure) and one or more computing device(s) 530. However, these components of the system 500 are merely exemplary and are not intended to be limiting in any way. For simplicity, reference may be made hereinafter to a unit 510 or a computing device 530, however, this is not intended to be limiting and may still refer to any number of such elements. Additionally, while the components of the system may involve the use case of a power plant, the methods described herein may be used in any other context as well (for example, even beyond a power plant).

A unit 510 may refer to any component that may be included within the power plant that may be monitored for a trip event. For example, a unit 510 may include any type of generator (although the figure shows a generator as an example, this is not intended to be limiting as to the type of units 510 that may exist in a power plant), a turbine, etc. The power plant may be any number of different types of power plants, such as a coal-fired power plant, a nuclear power plant, a wind farm, a hydroelectric power plant, a solar panel farm, etc.

Additionally, associated with a unit 510 may include any number of different types of sensor(s) 518 that may be used to capture data that may be used to monitor the operation of the unit 510 (such as the data associated with operation 102 of FIG. 1, operation 202 of FIG. 2A, input data 240 of FIG. 2B, operation 302 of FIG. 3A, input data 340 of FIG. 3B, and/or any other data mentioned herein). For example, the sensors 518 may include magnetoresistive (MR) sensors, variable reluctance (VR) sensors, optical sensors, temperature sensors, pressure sensors, and/or any other type of sensor that may be used to capture any type of data associated with operation of a unit 510 in a power plant. The types of sensors that are associated with a given unit 510 may depend on the type of unit. The unit 510 may also include one or more controller(s) 512, which may include one or more processor(s) 514 and memory 516. A controller 512 may also include one or more module(s) 520 that may be used to perform any of the operations described herein. That is, in one or more embodiments, the power plant controller that receives the indications of trip events associated with a unit may be a local controller that is associated with a given unit.

The one or more controller(s) may also be centralized controller(s) that perform operations with respect to some or all of the units 510 included within the power plant. That is, rather than a controller 512 being directly associated with a unit 510, in one or more embodiments, the system 500 may include one or more controller(s) 532 that receive data from multiple units 510 and perform automated control actions with respect to those units. Such controller(s) 532 may be located at the power plant or may be located remotely from the power plant. The controller 532 may also include one or more processors 534 and memory 536, as well as one or more module(s) 538. The one or more module(s) 538 may be used to facilitate any of the operations describes herein or otherwise with respect to monitoring data, predicting unit trips, sending warning signals, performing automated actions, etc.

In one or more embodiments, any of the elements of the system 500 (for example, one or more units 510, one or more computing devices 530, and/or any other element described with respect to FIG. 5 or otherwise) may be configured to communicate via a communications network 550. The communications network 550 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, the communications network 550 may have any suitable communication range associated therewith and may include, for example, global networks (e.g., the Internet), metropolitan area networks (MANs), wide area networks (WANs), local area networks (LANs), or personal area networks (PANs). In addition, communications network 320 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Finally, any the elements (for example, the one or more unit(s) 510, the one or more computing device(s) 530, and/or any other elements)) of the system 500 may include any of the elements of the system 700 as well.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 6:
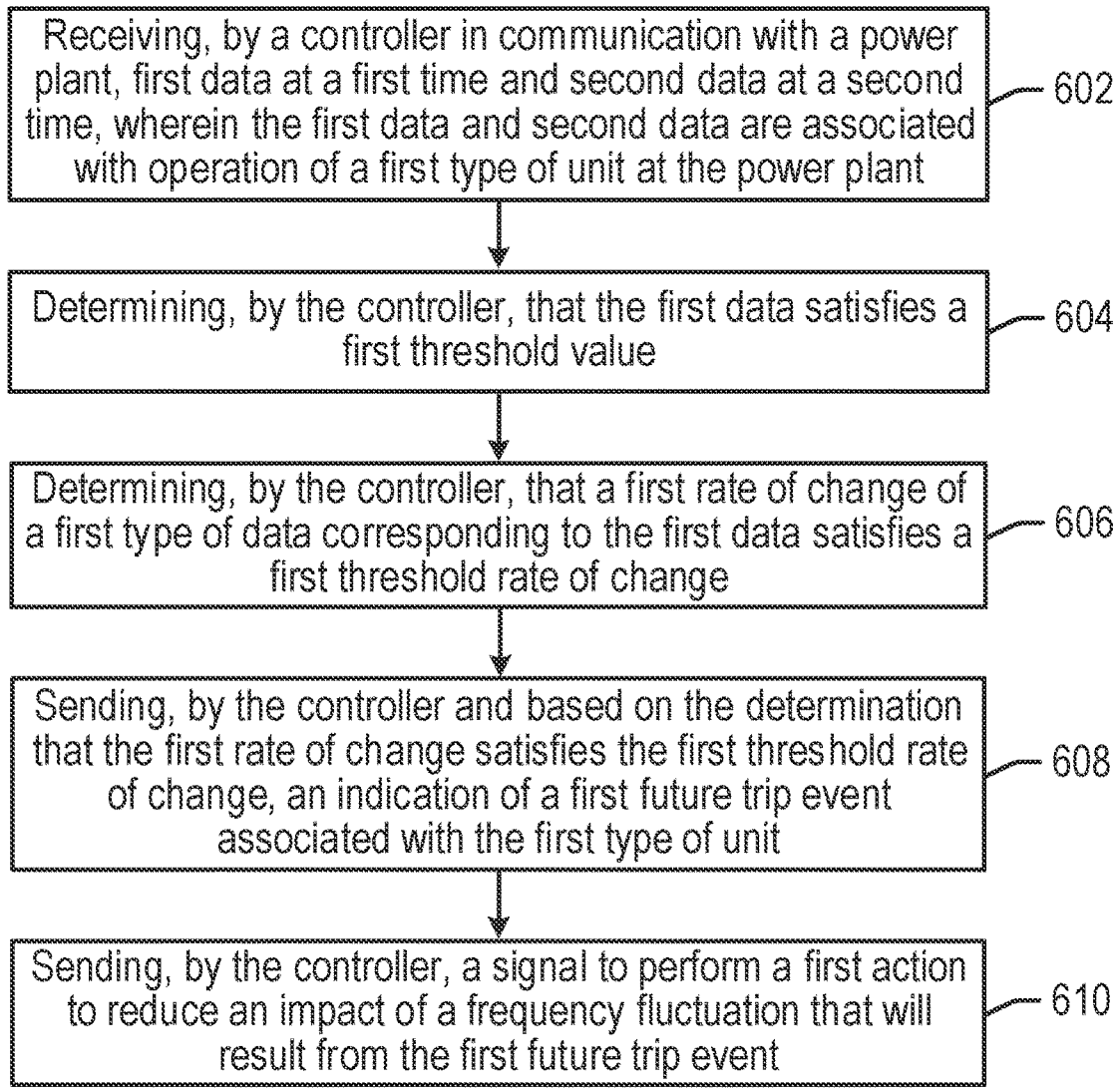
FIG. 6 is a block diagram of an example method, in accordance with one or more example embodiments of the disclosure.

FIG. 6 is an example process flow diagram of an illustrative method 600. At block 602, the method 600 may include receiving, by one or more processors associated with a power plant, first data at a first time and second data at a second time, wherein the first data and second data are a first type of data, and wherein the first data and second data are associated with operation of a first type of unit at a power plant. At block 604, the method 600 may include determining, by the one or more processors, that the first data or the second data satisfies a first threshold value. At block 606, the method 600 may include determining, by the one or more processors, that a first rate of change of the first type of data satisfies a first threshold rate of change. At block 608, the method 600 may include sending, by the one or more processors and based on the determination the first data or the second data satisfies the first threshold value and the determination that the first rate of change of the first type of data satisfies the first threshold rate of change, an indication of a first future trip event associated with the first type of unit. At block 610, the method 600 may include sending, based on the indication of the first future trip event, a signal to perform an action to reduce a frequency fluctuation that will result from the first future trip event.

The manner in which a threshold, set point, or any other value is "satisfied" may depend on a particular unit that is being monitored. For example, in some cases, data points may need to be greater than (or equal to) the thresholds, set points, etc. for them to be satisfied. In other cases, data points may need to be less than (or equal to) the thresholds, set points, etc. for them to be satisfied.

The operations described and depicted in the illustrative process flow of FIGS. 1-6 and may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-6 may be performed.

One or more operations of the process flow of FIGS. 1-6 may have been described above as being performed by a user device, or more specifically, by one or more program modules, applications, or the like executing on a device. It should be appreciated, however, that any of the operations of process flow of FIGS. 1-6 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 7:
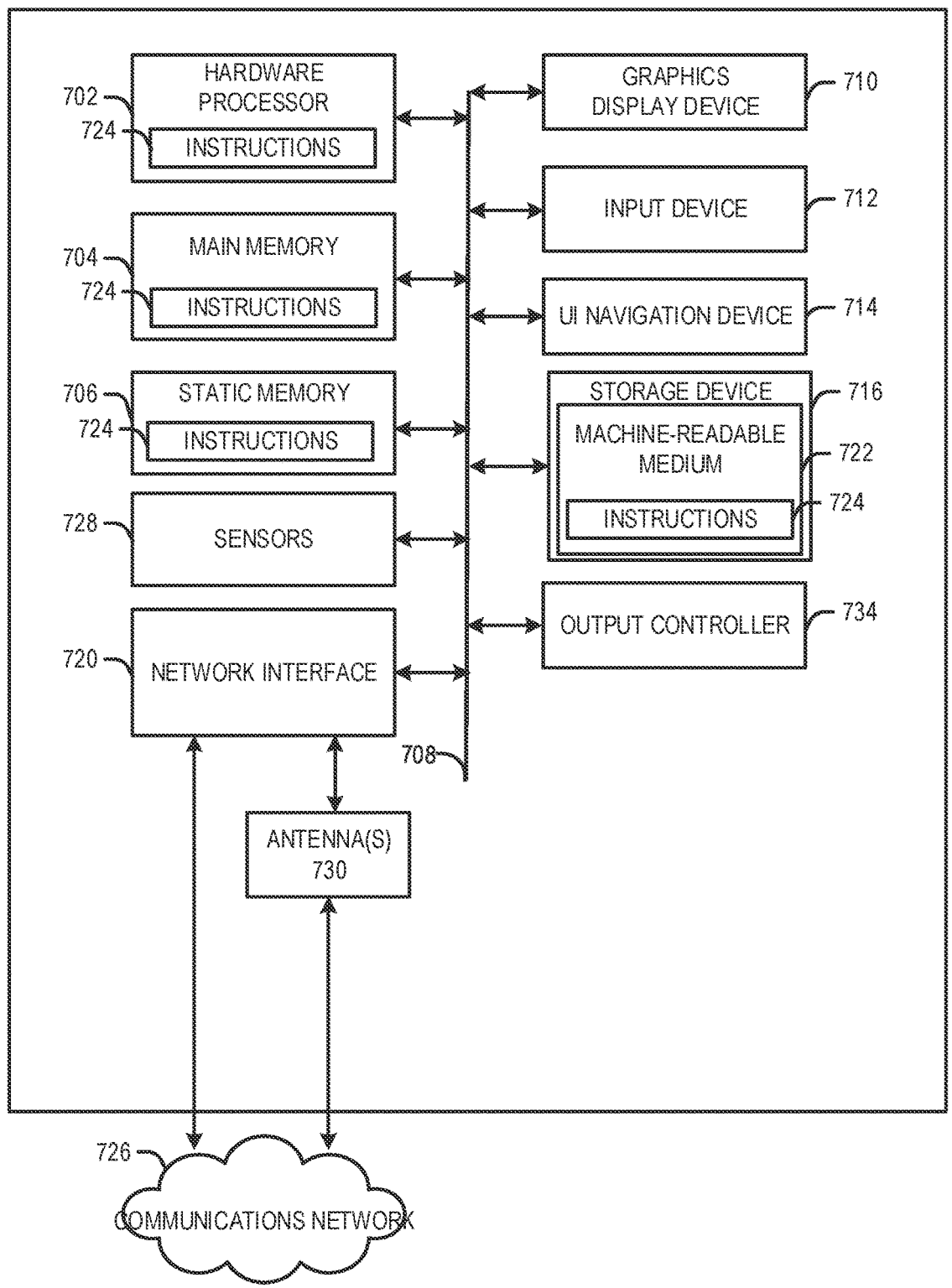
FIG. 7 is a block diagram of an example of a machine or system, in accordance with one or more example embodiments of the disclosure.

FIG. 7 is a block diagram of an example of a machine or system 700 in accordance with one or more example embodiments of the disclosure.

In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a server (e.g., a real-time server), a computer, an automation controller, a network router, a switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer-readable medium containing instructions where the instructions configure the execution units to carry out a specific operation when in operation. The configuration may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 798. The machine 700 may further include a graphics display device 710, an input device 712 (e.g., a keyboard), and a user interface (UI) navigation device 1014 (e.g., a mouse). In an example, the graphics display device 710, input device 712, and UI navigation device 714 may be a touch screen display. The machine 700 may additionally include a storage device (i.e., drive unit) 716, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "monitoring and computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, numerous other modifications and embodiments are within the scope of the disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or operations. Thus, such conditional language is not generally intended to imply that features, elements, and/or operations are in any way required for one or more embodiments.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database task or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Further aspects of the invention are provided by the subject matter of the following clauses:

1. A system comprising: memory operable to store a set of computer-executable instructions; one or more processors coupled to the memory, the one or more processors operable to execute the set of computer-executable instructions to: receive first data at a first time and second data at a second time, wherein the first data and second data are associated with operation of a first type of unit at the power plant system; determine that the first data satisfies a first threshold value; determine that a first rate of change of a first type of data corresponding to the first data satisfies a first threshold rate of change; send, based on the determination that the first rate of change satisfies the first threshold rate of change, an indication of a first future trip event associated with the first type of unit; and send a signal to perform a first action to reduce an impact of a frequency fluctuation that will result from the first future trip event.

2. The system of any preceding clause, wherein the first action includes at least one of: modifying operation of a second unit in the power plant or releasing a load associated with the power plant.

3. The system of any preceding clause, wherein the computer-executable instructions are further operable to: determine the first rate of change threshold based on a ratio of a difference between a trip set point and the first threshold value and an anticipated time value.

4. The system of any preceding clause, wherein the computer-executable instructions are further operable to: determine the first rate of change based on a slope of a plot including the first data and second data.

5. The system of any preceding clause, wherein the computer-executable instructions are further operable to: receive third data at a third time and fourth data at a fourth time, wherein the third data and fourth data are a second type of data, and wherein the third data and fourth data are associated with operation of a second type of unit at the power plant; determine that the third data or the fourth data satisfies a second threshold value; determine that a second rate of change of the second type of data satisfies a second threshold rate of change; send, based on the determination the third data or the fourth data satisfies the second threshold value and the determination that the second rate of change of the second type of data satisfies the second threshold rate of change, an indication of a second future trip event associated with the second type of unit; and send, based on the indication of the second future trip event, a signal to perform a second action to reduce a frequency fluctuation that will result from the second future trip event.

6. The system of any preceding clause, wherein the first data and second data are captured in real-time.

7. The system of any preceding clause, wherein the indication also includes an estimated amount of time until the first future trip event occurs.

8. A method comprising: receiving, by a controller in communication with a power plant, first data at a first time and second data at a second time, wherein the first data and second data are associated with operation of a first type of unit at the power plant; determining, by the controller, that the first data satisfies a first threshold value; determining, by the controller, that a first rate of change of a first type of data corresponding to the first data satisfies a first threshold rate of change; sending, by the controller and based on the determination that the first rate of change satisfies the first threshold rate of change, an indication of a first future trip event associated with the first type of unit; and sending, by the controller, a signal to perform a first action to reduce an impact of a frequency fluctuation that will result from the first future trip event.

9. The method of any preceding clause, wherein the action includes at least one of: modifying operation of a second unit in the power plant or releasing a load associated with the power plant.

10. The method of any preceding clause, further comprising: determining the first rate of change threshold based on a ratio of a difference between a trip set point and the first threshold value and an anticipated time value.

11. The method of any preceding clause, further comprising: determining the first rate of change based on a slope of a plot including the first data and second data.

12. The method of any preceding clause, further comprising: receiving third data at a third time and fourth data at a fourth time, wherein the third data and fourth data are a second type of data, and wherein the third data and fourth data are associated with operation of a second type of unit at the power plant; determining that the third data or the fourth data satisfies a second threshold value; determining that a second rate of change of the second type of data satisfies a second threshold rate of change; sending, based on the determination the third data or the fourth data satisfies the second threshold value and the determination that the second rate of change of the second type of data satisfies the second threshold rate of change, an indication of a second future trip event associated with the second type of unit; and sending, based on the indication of the second future trip event, a signal to perform a second action to reduce a frequency fluctuation that will result from the second future trip event.

13. The method of any preceding clause, wherein the first data and second data are captured in real-time.

14. The method of any preceding clause, wherein the indication also includes an estimated amount of time until the first future trip event occurs.

15. A non-transitory computer-readable medium storing computer-executable instructions, that when executed by one or more processors, cause the one or more processors to: receive first data at a first time and second data at a second time, wherein the first data and second data are associated with operation of a first type of unit at a power plant; determine that the first data satisfies a first threshold value; determine that a first rate of change of a first type of data corresponding to the first data satisfies a first threshold rate of change; send, based on the determination that the first rate of change satisfies the first threshold rate of change, an indication of a first future trip event associated with the first type of unit; and send a signal to perform a first action to reduce an impact of a frequency fluctuation that will result from the first future trip event.

16. The non-transitory computer-readable medium of any preceding clause, wherein the action includes at least one of: modifying operation of a second unit in the power plant or releasing a load associated with the power plant.

17. The non-transitory computer-readable medium of any preceding clause, wherein the computer-executable instructions are further operable to: determine the first rate of change threshold based on a ratio of a difference between a trip set point and the first threshold value and an anticipated time value.

18. The non-transitory computer-readable medium of any preceding clause, wherein the computer-executable instructions are further operable to: determine the first rate of change based on a slope of a plot including the first data and second data.

19. The non-transitory computer-readable medium of any preceding clause, wherein the computer-executable instructions are further operable to: receive third data at a third time and fourth data at a fourth time, wherein the third data and fourth data are a second type of data, and wherein the third data and fourth data are associated with operation of a second type of unit at the power plant; determine that the third data or the fourth data satisfies a second threshold value; determine that a second rate of change of the second type of data satisfies a second threshold rate of change; send, based on the determination the third data or the fourth data satisfies the second threshold value and the determination that the second rate of change of the second type of data satisfies the second threshold rate of change, an indication of a second future trip event associated with the second type of unit; and send, based on the indication of the second future trip event, a signal to perform a second action to reduce a frequency fluctuation that will result from the second future trip event.

20. The non-transitory computer-readable medium of any preceding clause, wherein the first data and second data re captured in real-time.

That which is claimed is:

1. A power plant system comprising:
memory operable to store a set of computer-executable instructions;
one or more processors coupled to the memory, the one or more processors operable to execute the set of computer-executable instructions to:
receive first data at a first time prior to a first future trip event and second data at a second time prior to the first future trip event, wherein the first data and second data comprise at least one of speed data, temperature data, pressure data, optical data, resistive data, or reluctance data and are associated with operation of a first type of unit at the power plant system;
determine that the first data satisfies a first threshold value;
determine that a first rate of change of a first type of data corresponding to the first data satisfies a first threshold rate of change indicative of the first future trip event;
send, based on the determination that the first rate of change satisfies the first threshold rate of change, an indication that the first future trip event is likely to occur and be associated with the first type of unit; and
send a signal to perform a first action to reduce an impact of a frequency fluctuation that will result from the first future trip event.

2. The system of claim 1, wherein the first action includes at least one of: modifying operation of a second unit in the power plant system or releasing a load associated with the power plant system.

3. The system of claim 1, wherein the computer-executable instructions are further operable to:
determine the first rate of change threshold based on a ratio of a difference between a trip set point and the first threshold value and an anticipated time value.

4. The system of claim 1, wherein the computer-executable instructions are further operable to:
determine the first rate of change based on a slope of a plot including the first data and second data.

5. The system of claim 1, wherein the computer-executable instructions are further operable to:
receive third data at a third time and fourth data at a fourth time, wherein the third data and fourth data are a second type of data, and wherein the third data and fourth data are associated with operation of a second type of unit at the power plant system;
determine that the third data or the fourth data satisfies a second threshold value;
determine that a second rate of change of the second type of data satisfies a second threshold rate of change;
send, based on the determination the third data or the fourth data satisfies the second threshold value and the determination that the second rate of change of the second type of data satisfies the second threshold rate of change, an indication of a second future trip event associated with the second type of unit; and
send, based on the indication of the second future trip event, a signal to perform a second action to reduce a frequency fluctuation that will result from the second future trip event.

6. The system of claim 1, wherein the first data and second data are captured in real-time.

7. The system of claim 1, wherein the indication also includes an estimated amount of time until the first future trip event occurs.

8. A method comprising:
receiving, by a controller in communication with a power plant, first data at a first time prior to a first future trip event and second data at a second time prior to the first future trip event, wherein the first data and second data comprise at least one of speed data, temperature data, pressure data, optical data, resistive data, or reluctance data and are associated with operation of a first type of unit at the power plant;
determining, by the controller, that the first data satisfies a first threshold value;
determining, by the controller, that a first rate of change of a first type of data corresponding to the first data satisfies a first threshold rate of change indicative of the first future trip event;
sending, by the controller and based on the determination that the first rate of change satisfies the first threshold rate of change, an indication that the first future trip event is likely to occur and be associated with the first type of unit; and
sending, by the controller, a signal to perform a first action to reduce an impact of a frequency fluctuation that will result from the first future trip event.

9. The method of claim 8, wherein the first action includes at least one of: modifying operation of a second unit in the power plant or releasing a load associated with the power plant.

10. The method of claim 8, further comprising:
determining the first rate of change threshold based on a ratio of a difference between a trip set point and the first threshold value and an anticipated time value.

11. The method of claim 8, further comprising:
determining the first rate of change based on a slope of a plot including the first data and second data.

12. The method of claim 8, further comprising:
receiving third data at a third time and fourth data at a fourth time, wherein the third data and fourth data are a second type of data, and wherein the third data and fourth data are associated with operation of a second type of unit at the power plant;
determining that the third data or the fourth data satisfies a second threshold value;
determining that a second rate of change of the second type of data satisfies a second threshold rate of change;
sending, based on the determination the third data or the fourth data satisfies the second threshold value and the determination that the second rate of change of the second type of data satisfies the second threshold rate of change, an indication of a second future trip event associated with the second type of unit; and
sending, based on the indication of the second future trip event, a signal to perform a second action to reduce a frequency fluctuation that will result from the second future trip event.

13. The method of claim 8, wherein the first data and second data are captured in real-time.

14. The method of claim 8, wherein the indication also includes an estimated amount of time until the first future trip event occurs.

15. A non-transitory computer-readable medium storing computer-executable instructions, that when executed by one or more processors, cause the one or more processors to:
receive first data at a first time prior to a first future trip event and second data at a second time prior to the first future trip event, wherein the first data and second data comprise at least one of speed data, temperature data, pressure data, optical data, resistive data, or reluctance data and are associated with operation of a first type of unit at a power plant;
determine that the first data satisfies a first threshold value;
determine that a first rate of change of a first type of data corresponding to the first data satisfies a first threshold rate of change indicative of the first future trip event;
send, based on the determination that the first rate of change satisfies the first threshold rate of change, an indication that the first future trip event is likely to occur and be associated with the first type of unit; and
send a signal to perform a first action to reduce an impact of a frequency fluctuation that will result from the first future trip event.

16. The non-transitory computer-readable medium of claim 15, wherein the first action includes at least one of: modifying operation of a second unit in the power plant or releasing a load associated with the power plant.

17. The non-transitory computer-readable medium of claim 15, wherein the computer-executable instructions are further operable to:
determine the first rate of change threshold based on a ratio of a difference between a trip set point and the first threshold value and an anticipated time value.

18. The non-transitory computer-readable medium of claim 15, wherein the computer-executable instructions are further operable to:
determine the first rate of change based on a slope of a plot including the first data and second data.

19. The non-transitory computer-readable medium of claim 15, wherein the computer-executable instructions are further operable to:
receive third data at a third time and fourth data at a fourth time, wherein the third data and fourth data are a second type of data, and wherein the third data and fourth data are associated with operation of a second type of unit at the power plant;

determine that the third data or the fourth data satisfies a second threshold value;
determine that a second rate of change of the second type of data satisfies a second threshold rate of change;
send, based on the determination the third data or the fourth data satisfies the second threshold value and the determination that the second rate of change of the second type of data satisfies the second threshold rate of change, an indication of a second future trip event associated with the second type of unit; and
send, based on the indication of the second future trip event, a signal to perform a second action to reduce a frequency fluctuation that will result from the second future trip event.

20. The non-transitory computer-readable medium of claim 15, wherein the first data and second data are captured in real-time.

\* \* \* \* \*